Jan. 20, 1931.  K. T. POTTHOFF  1,789,596
METHOD AND APPARATUS FOR TREATING PIPES, BARS, ETC
Filed April 18, 1925  8 Sheets-Sheet 1
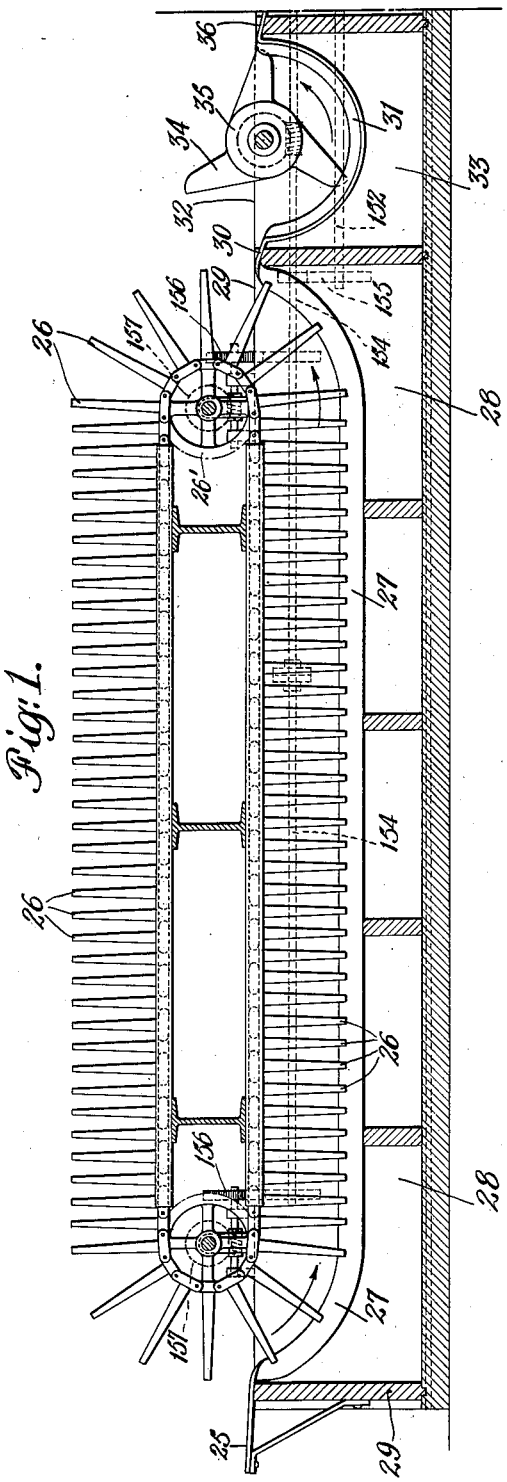

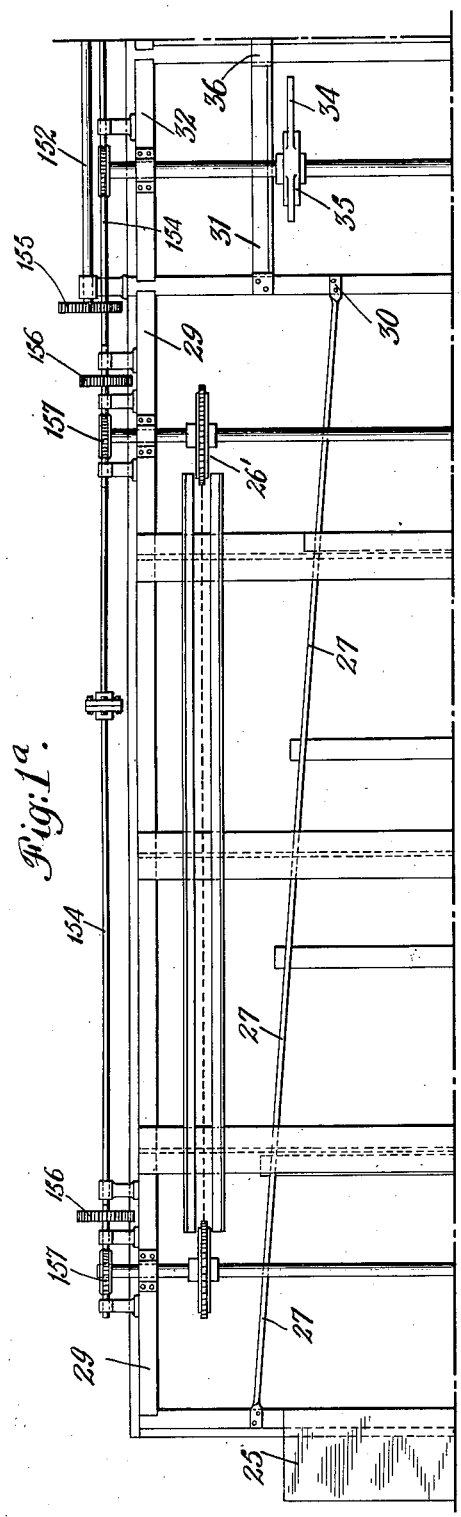

Jan. 20, 1931. K. T. POTTHOFF 1,789,596
METHOD AND APPARATUS FOR TREATING PIPES, BARS, ETC
Filed April 18, 1925 8 Sheets-Sheet 3
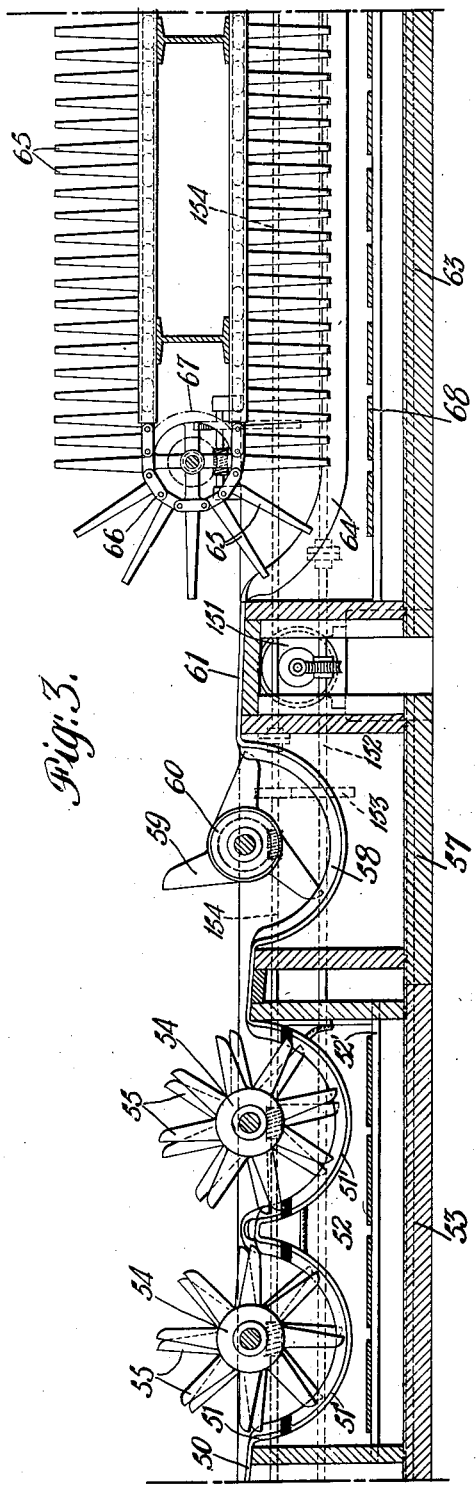
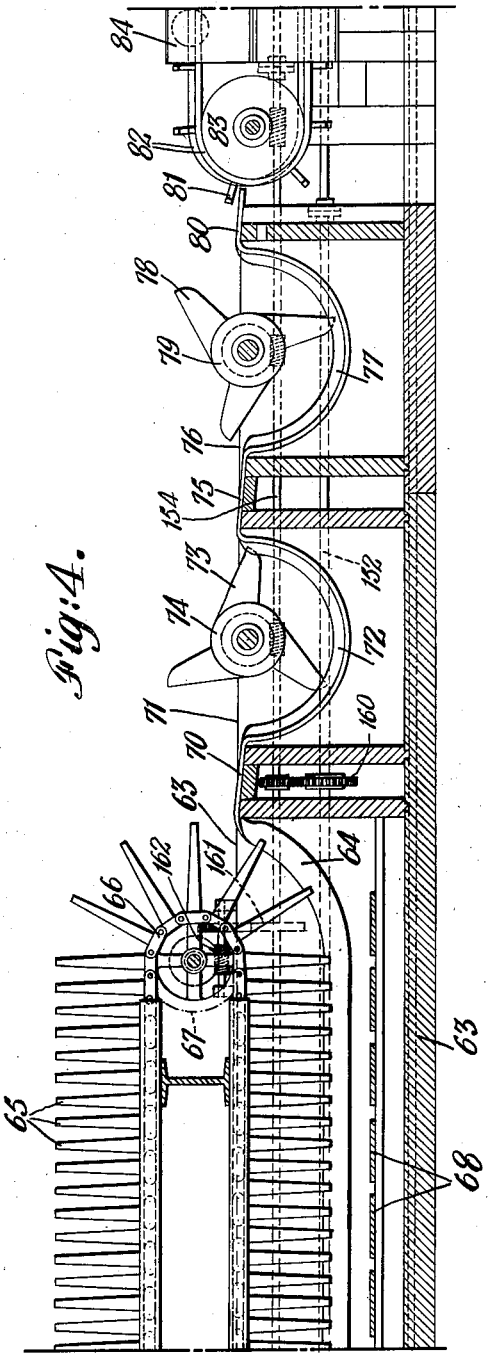
INVENTOR
Kurt T. Potthoff
BY Edwards, Sager & Bower
ATTORNEYS Jan. 20, 1931.  K. T. POTTHOFF  1,789,596
METHOD AND APPARATUS FOR TREATING PIPES, BARS, ETC
Filed April 18, 1925    8 Sheets-Sheet 4
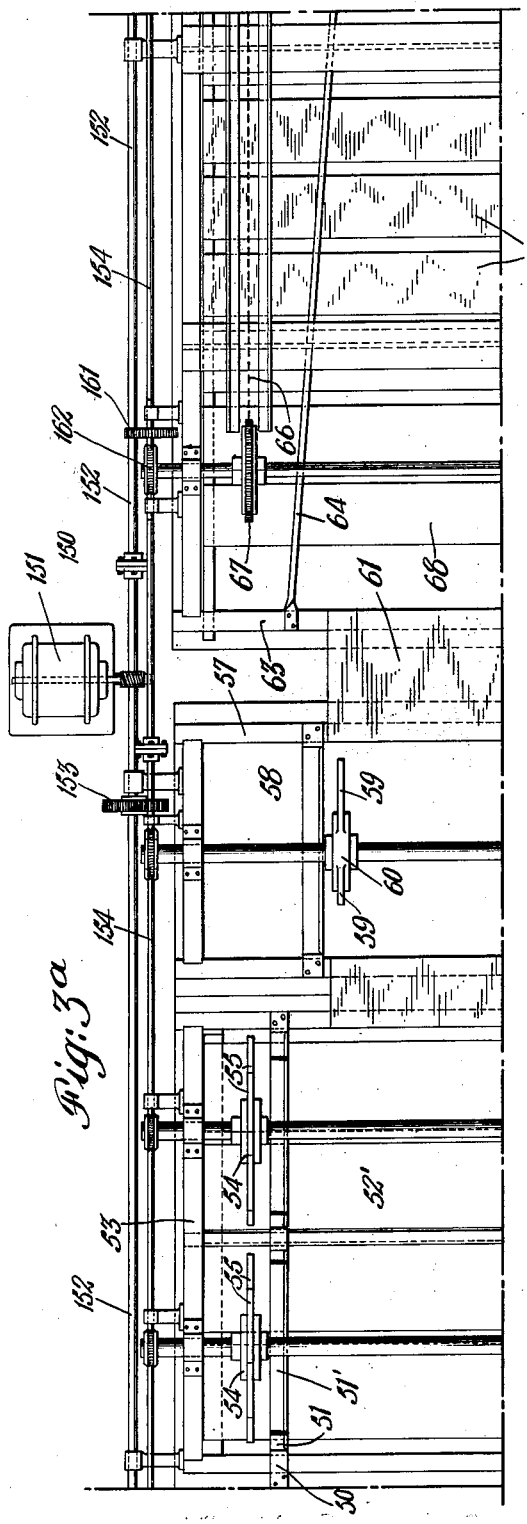
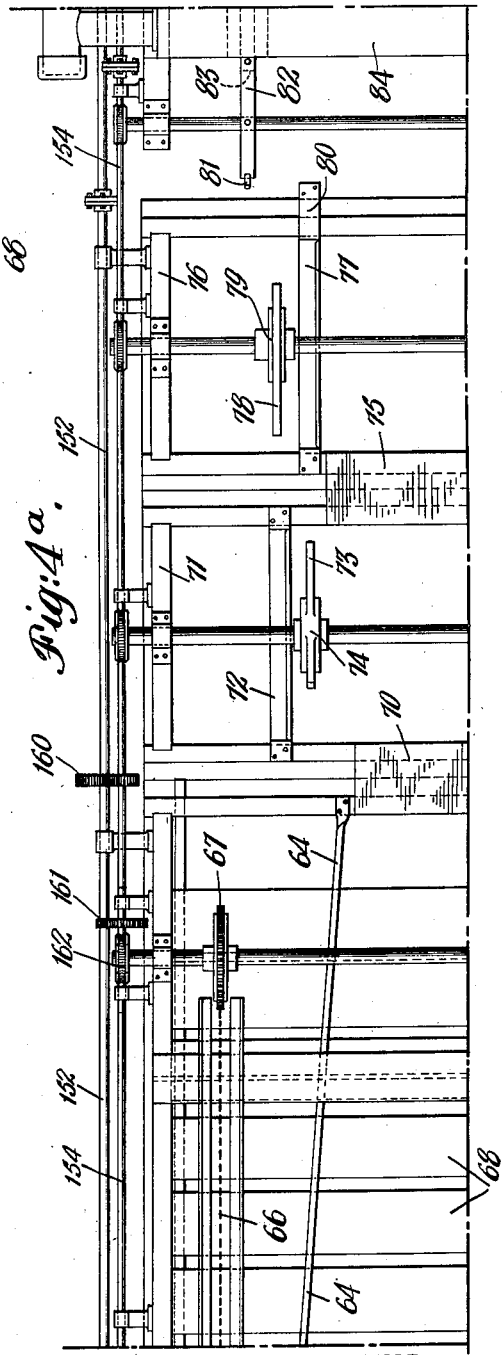

Jan. 20, 1931.  K. T. POTTHOFF  1,789,596
METHOD AND APPARATUS FOR TREATING PIPES, BARS, ETC
Filed April 18, 1925  8 Sheets-Sheet 5

INVENTOR
Kurt T. Potthoff
BY Edwards, Sager & Bower
ATTORNEYS

Jan. 20, 1931. K. T. POTTHOFF 1,789,596
METHOD AND APPARATUS FOR TREATING PIPES, BARS, ETC
Filed April 18, 1925 8 Sheets-Sheet 6
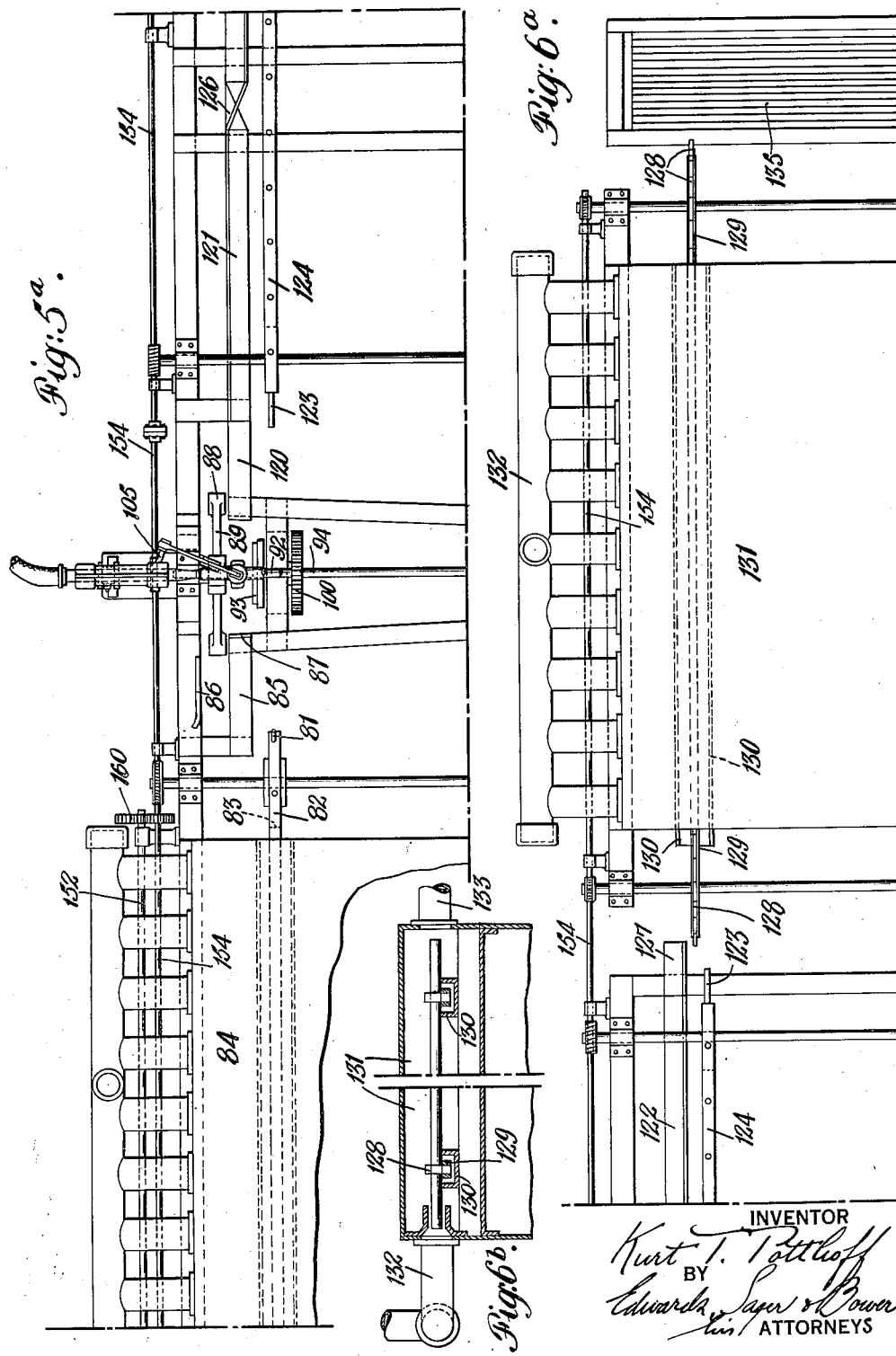

Jan. 20, 1931. K. T. POTTHOFF 1,789,596
METHOD AND APPARATUS FOR TREATING PIPES, BARS, ETC
Filed April 18, 1925 8 Sheets-Sheet 7
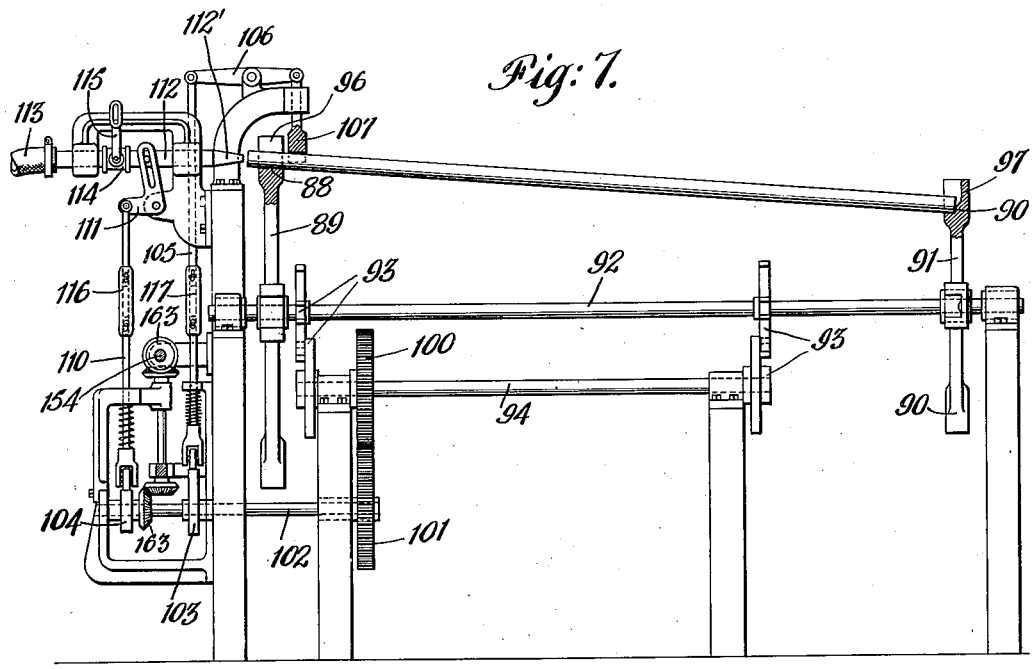
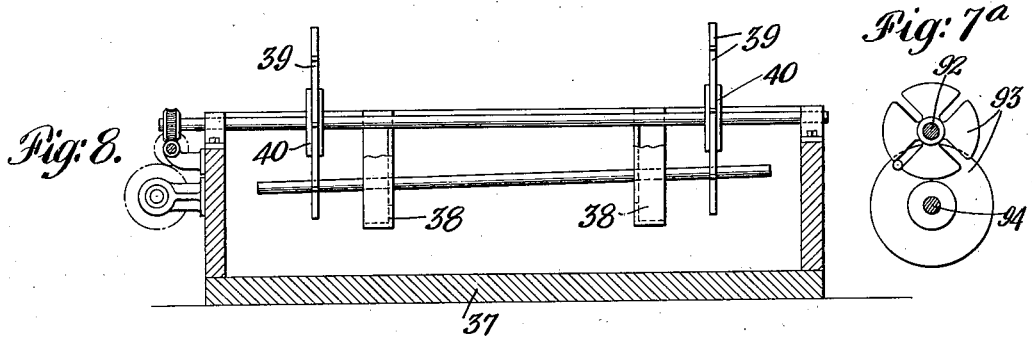
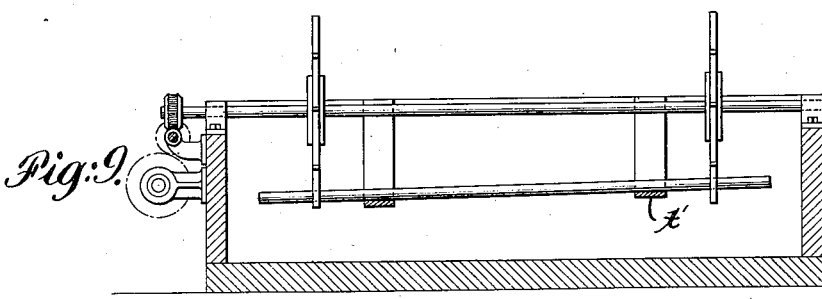
INVENTOR
Kurt T. Potthoff
BY
Edwards, Sager & Bower
ATTORNEYS

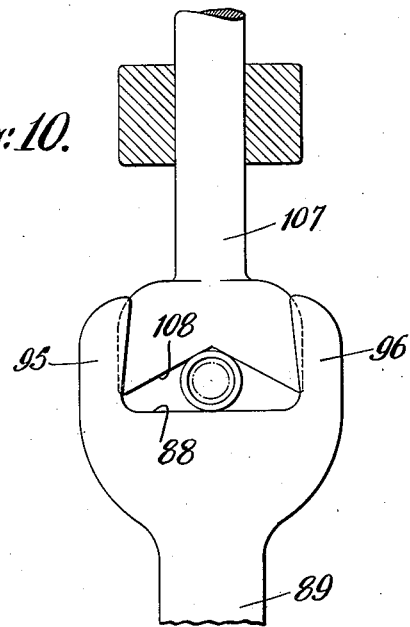
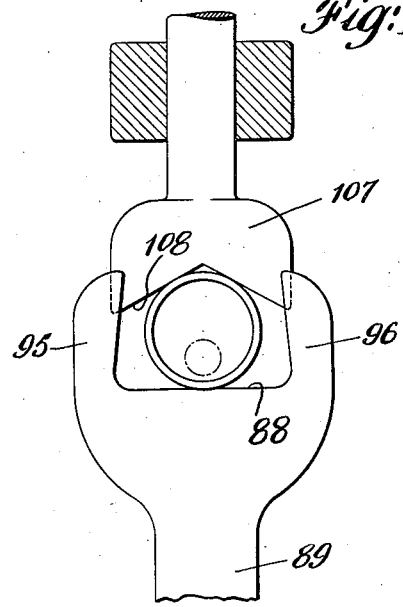
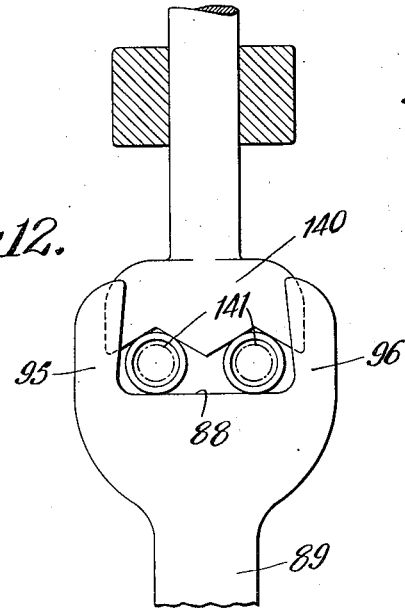
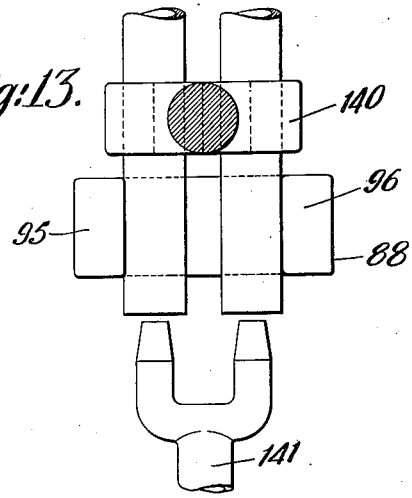

Patented Jan. 20, 1931

1,789,596

UNITED STATES PATENT OFFICE

KURT THEODORE POTTHOFF, OF LYNBROOK, LONG ISLAND, NEW YORK, ASSIGNOR TO U. S. GALVANIZING & PLATING EQUIPMENT CORPORATION, A CORPORATION OF NEW YORK

METHOD AND APPARATUS FOR TREATING PIPES, BARS, ETC.

Application filed April 18, 1925. Serial No. 24,053.

This invention relates to a method and apparatus for coating articles and particularly to the coating of a tubular article such as a pipe.

The object of the invention is to provide a process and apparatus which will automatically prepare the pipes for coating and apply and harden the coating, passing the pipes through these operations so that uncoated pipes are received at one end of the apparatus and are delivered coated at the other end.

Further objects of the invention particularly in the provision of a method and apparatus for also plating the articles will appear from the following description taken in connection with the accompanying drawings, in which Figs. 1, 2, 3, 4, 5 and 6 are sectional elevational views of successive portions of apparatus adapted to carry out the invention.

Figs. 1a, 2a, 3a, 4a, 5a and 6a are corresponding plan views of the same and Fig. 6b is a section on line b—b of Fig. 6.

Fig. 7 is a vertical sectional view taken transversely across the machine just in advance of the pipe transfer means for the enameling mechanism and illustrating a mechanism for holding the pipe and applying a coating to its interior.

Fig. 7a is a detailed sectional view taken on the line 7—7 of Fig. 7.

Figs. 8 and 9 are transverse sectional views illustrating alternative methods of conveying and tipping the pipe.

Figs. 10 and 11 are detail views showing the action of the jaws holding the end of the pipe for the coating operation, and Figs. 12 and 13 are elevational and plan views respectively of a modified detail of coating mechanism.

Figure 5:
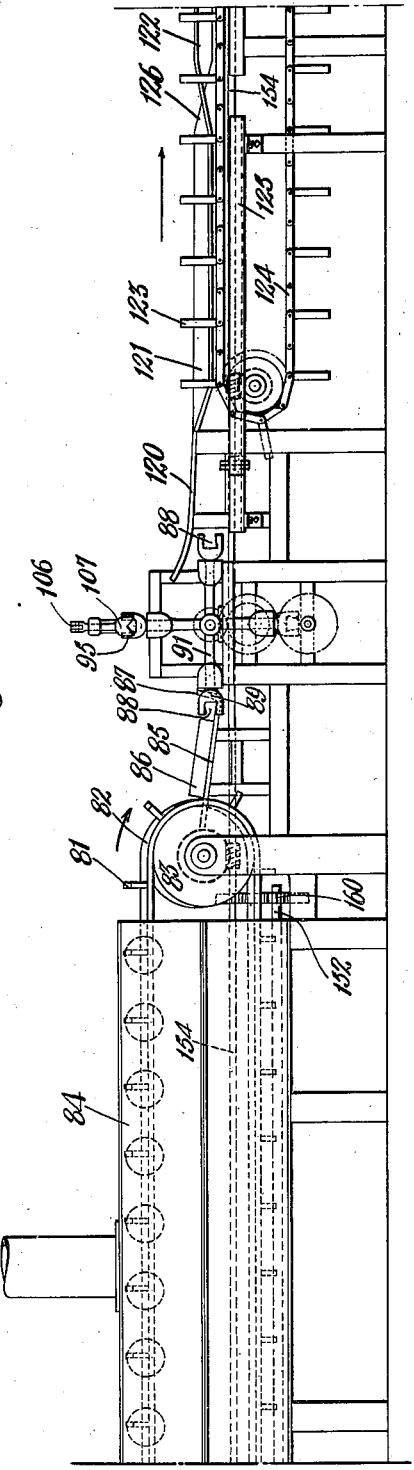
Figure 6:
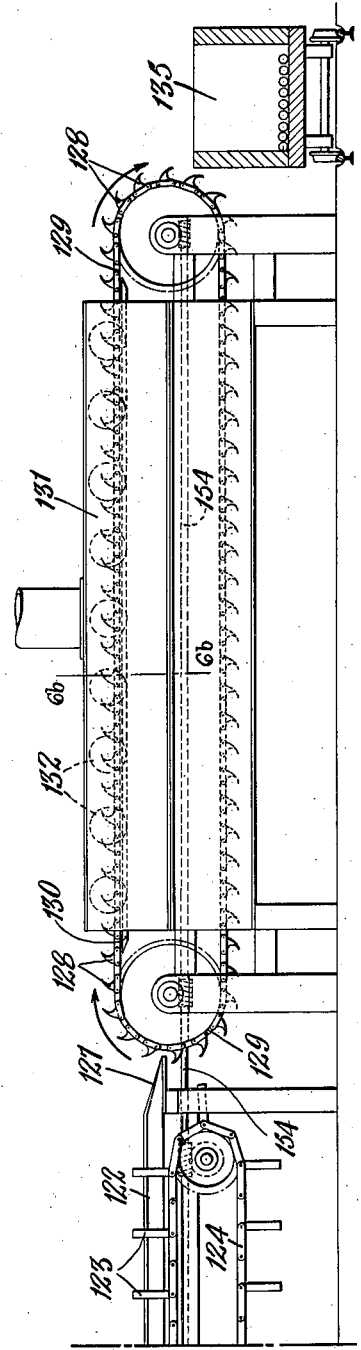

The pipes to be treated are fed to the machine along table 25 to the conveyor in such sequence as not to become jammed between the conveyor arms 26. Usually one large pipe or two small pipes will be fed to each successive space between said arms 26 which lower the pipes along the tracks 27 and into the cleaning liquid 28 in the tank 29. The liquid 28 is any desired cleaning solution such as an alkali for removing grease and the like from the outside of the pipe. Where it is desired to remove grease or the like from the inside of the pipe the conveying means 26, 27 will be replaced by conveying means 38, 39, 40 hereinafter described. Current may be supplied to the articles by providing the tracks 27 or portions of them with cathode strips contacting with the pipes and at the same time supplying current to the liquid by an anode terminal.

The arms 26 roll the pipes along the tracks 27 through this solution and then carry the pipes up out of the solution, permitting the liquid to drain off and passing the pipes on to incline 30 and semicircular tracks 31 in the rinsing tank 32. The rinsing fluid 33 such as water in this tank removes the cleaning liquid and the pipes are carried up out of this rinsing tank by the conveyor arms 34 of the rotary spiders 35 which are timed to receive and deliver the pipes individually.

The pipes delivered from the rinse 33 roll down incline 36 into a second treating liquid 37 such as an acid bath for "pickling" the pipes by chemical action removing scale and renewing the surfaces of the pipe preparatory to receiving a coating material. I have found it important to make the action of such a solution even and thorough particularly within the pipe. To attain this the solution within the pipe is constantly renewed so as not to become weakened and irregular in its action. Each pipe on rolling down incline 36 and semicircular tracks 38 is received by the arms 39 of spiders 40, these spiders being angularly offset as shown so that (viewed in endwise projection Fig. 2) the arms 39 at one end of the pipe are out of register with the arms at the other end. As the pipe passes down into the liquid one end of the pipe is thus higher than the other and the liquid will naturally tend to circulate thoroughly in the interior of the pipe displacing any air bubbles and the like and completely filling the pipe.

As the pipe reaches the lowermost portion of tracks 38 its ends are substantially at the same level and then as the following arms engage the pipe to lift it up along the tracks 38 the previously lower end is gradually raised above the other end so as to again provide for a natural circulation and the renewal of the solution and the removal of any accumulated air bubbles. The raised end of the pipe will pass out of the liquid 37 and the interior liquid will of course flow down toward the lower end and the entire pipe in inclined position will be raised out of the liquid so as to drain off the solution from the interior of the pipe. The pipe thus inclined is passed on to the correspondingly inclined support 41 across which it rolls to the semicircular tracks 42 where it is received by the arms 43 of spiders 44. These spiders 44 are offset with relation to each other in a direction opposite to the offset of the spiders 40 so that the inclination of the pipe at the entrance portion of the tracks 42 is opposite to the inclination at the entrance portion of tracks 38. The pipe is thus carried down along the tracks 42 with its near end (Fig. 2) below the other end with the same advantageous natural circulation of the pickling liquid. Similarly at the bottom of tracks 42 the following arms 43 pick up the pipe and gradually reverse its inclination and carry it in inclined position up the discharge portion of tracks 42 draining it in a direction opposite to the previous draining and delivering the pipe to the inclined support 45 where it is deposited with its near end (Fig. 2) higher than its far end.

These conveyor units each alternately submerging the inclined pipe in the solution and lifting it in oppositely inclined positions are repeated in the tank 37 to subject the pipe to the action of the solution a desired number of times. In the apparatus shown there are six of these units.

The apparatus for renewal of the liquid within the interior of the article in alternate opposite directions is the subject matter claimed in my divisional application Serial No. 238,004, now Patent No. 1,720,525.

From the last unit the pipe is delivered to the incline 50 down which it rolls to the tracks 51 and into the auxiliary bath 52 in tank 53 forming a pickle solution or acid dip or the like. In this tank the two conveyor spiders 54 with arms 55 tip and drain the pipes as explained in connection with the conveyor units of tank 37. Cathode strips 51′ may be provided along the tracks 51 to supply current to the pipes while completely immersed in the liquid, an anode terminal 52′ being provided to complete the circuit through the liquid. The cathode strips 51′ should be so arranged as to make or break contact with the pipe only when the pipe is submerged in the liquid because discoloration or spotting may result if a cathode contact is made with a pipe not sufficiently submerged in the electrolyte. The pipes thus freshly cleaned, pickled and dipped are passed to the rinsing tank 57 into which they pass along tracks 58 to be carried up by the arms 59 of conveyor wheel 60 to the drain table 61. Along the drain table 61 the pipes roll to the next operation which in the specific apparatus shown is plating in the tank 63. In this tank the pipes are received on the tracks 64 and between the arms 65 carried by the conveyor chains 66 running on sprocket wheels 67 at each end of the tank. The tracks 64 may have metallic cathode strips along which the pipes are rolled by the conveyor arm 65 while the anodes 68 complete the circuit to galvanize or otherwise plate the pipes as they pass through the tank. The pipes may be simply passed through a plating solution without supplying current where the plating solution will give a satisfactory coating without the current.

From the plating tank 63 the articles are lifted by the conveyor and pass to incline 70 along which they roll to the cold rinse tank 71, the pipes passing down into the tank on track 72 and being lifted therefrom by the conveyor arms 73 of the wheel 74. The pipes then pass along the incline 75 into the hot rinse tank 76 along the tracks 77 and are lifted out by the arms 78 of the wheel 79 and are thus delivered, cleaned and plated to the table 80.

From the table 80 the pipes are lifted by the lugs 81 of the conveyor chains 82 running on sprockets 83 at each end, the sprockets on one side being at a higher level than those on the other so that the pipe will be inclined as it is lifted from the table 80 and carried through the drier chamber 84 to which heat is supplied. This inclination of the pipe during the drying operation provides for a natural circulation of air through the pipe and also tends to move and drain away any liquid clinging to the surface of the pipe. A blower or circulating fan may also be used to pass air through the pipes.

Fig. 8 is a sectional view on the line 8—8 of Fig. 2 showing the tipping of the pipe by the offset of the rotatable conveyor arms on opposite sides with relation to each other, and Fig. 9 is a similar section showing the pipe tipped by having one of the conveyor tracks $t'$ at a higher level than the other, the conveyor arms in such case not necessarily being offset with relation to each other. It is obvious that still other means may be employed to give inclination to the pipe as it is passing through the liquid.

The conveyor 81—82 deposits the dried pipes on the inclined table 85 whereon they are aligned by the end guides 86—86′ and rolled down to the end trough 87, the end guide 86′ being adjustable for different lengths of pipes.

The pipe thus accurately positioned in the trough 87 is picked up at its opposite ends by the sockets 88 of the spider 89 at one end and the sockets 90 of the spider 91 at the other end, both of these spiders 89 and 91 being rigidly fastened to a shaft 92 driven through the intermittent movement mechanism 93 from the continuously rotating shaft 94. The socket 88 is in the form of a fork having prongs 95 and 96. As the arm 89 rotates the pipe is lifted and slides down within the socket between the sides 95 and 96. The socket 90 is similar to the socket 88 in form but is provided with an end stop or wall 97 engaging the end of the pipe to prevent it from slipping endwise.

The shaft 92 rotates the arms 89 and 91 to carry the sockets 88 and 90 just in position to receive the ends of the pipes from the trough 87. Here the parts pause for the completion of the coating operation on the preceding pipe; then the quarter revolution of the shaft 92 causes the sockets 88 and 90 to pick up the pipe from the trough 87 and carry it to the uppermost position where the parts again pause to hold the pipe in inclined position for coating. The shaft 92 thus has four intermittent movements of one quarter of a revolution each with a pause between these movements during which the coating is applied to the pipe.

While the pipe is in coating position the driving gear 100 and the intermediate gear 101 continuously rotate so that the shaft 102 of gear 101 continuously rotates the clamp cam 103 and the nozzle cam 104. These cams are so formed that just as the pipe reaches its uppermost coating position cam 103 will lift the connecting link 105 to tip lever 106 and press clamp 107 downward on the pipe to hold it in place in the sockets 88—90, the face of the clamp 107 being formed as a V 108 so as to automatically center various sized pipes as shown in Figs. 10 and 11.

As soon as the pipe is thus centered the cam 104 moves upward the connecting link 110 tips bell crank 111 to move inward the nozzle 112 receiving its supply of coating material such for instance as enamel through the flexible pipe 113. The supply in this pipe is kept under pressure and the pipe of nozzle 112 is provided with a valve 114 which is automatically opened by the link 115 during the inward movement of the nozzle 112, when its tapered end 112' enters the end of the pipe, the pressure on the enamel and the opening on the valve 114 being prearranged to supply the interior of the pipe with just enough enamel to cover the interior surface as hereinafter explained. The continued rotation of shaft 102 continues the movement of the cams 103 and 104 so as to release the clamp 107 and withdraw the nozzle 112 and it is to be noted that the links 105, 110 are yieldable in length as indicated at 116 and 117 so as to resiliently adapt the clamping and nozzle mechanisms to various sizes and lengths of pipe.

The next quarter revolution of this spider 89 carries the pipe to the inclined table 120 along which it rolls to the tracks 121 and 122, a chain 124 being provided with arms 123 to engage the pipes and lift them and roll them along these tracks 121 and 122. The track 122 is below track 121 so that the pipe is rolled in inclined position distributing the enamel over the interior surface and draining off any excess into the trough 125. The inclination of the pipe is then reversed by the opposite inclines 126 raising the track 122 above the track 121 and the pipe is rolled with this inclination to the incline 127 along which its raised end rolls downward and the pipe is delivered to the arms 128 of the chain 129 which arms carry the pipes into the baking oven 131, the pipes being carried along the tracks 130 extending through the oven so that the pipes will be rolled in substantially horizontal position through the oven. During the passing of the pipes through the baking oven 131 a hot blast of air is blown through the pipes from a supply 132 to an outlet 133 on the opposite side and this outlet 133 may be provided with a suction fan of sufficient capacity to draw off the air supply and to prevent the vapors of the enamel from escaping into the room.

During all its travel from the nozzle 112 the enamel on the interior of the pipe has been gradually setting and in the baking oven this setting is carried far enough to prevent the enamel from flowing or from being further affected by the handling of the pipe. Or if desired this baking may be carried to the point of producing a final set in the enamel so that this enamel is baked to the interior of the pipe and permanently hardened in the oven.

The pipes thus finished are delivered to any desired receiving means such as the car 135.

Various sizes of pipes may be handled by the apparatus shown and as indicated in Figs. 12 and 13 two of the smaller sizes of pipes may be substituted for a large size pipe by simply substituting a double form of clamp 140 and nozzle 141. Adjustment of the mechanism to variations in the lengths of the pipes is also provided for in the apparatus shown, and the driving means is preferably such as to receive power at a single point such as 150, and transmit it by properly timed and coordinated mechanism to the various operating parts as shown.

In the apparatus shown in the drawings and referring to Fig. 3a a motor 151 through a worm and worm wheel drive rotates the primary shaft 152 and from this primary shaft spur gears drive secondary shafts at various points along the apparatus. Proceeding towards the left in the Figs. 3 and 3a spur gears 153 drive the secondary shaft 154 and this shaft in turn through worm and worm wheel connections drives the shafts of spiders 60, 54, 40 and 35. Other sets of similar spur gears 155 carry the drive from shaft 152 to 154 at other points so as not to accumulate any twist in the drive which might offset the parts out of desired synchronism. The extended portion of the shaft 154 through spur gears 156 and worm and worm wheel gearing 157 drives the sprockets 26' of the conveyor 26.

Proceeding in the opposite direction from point 150 the shaft 152 through two sets of spur gears 160 drives the secondary shaft 154, and this shaft through spur gears 161 and worm and worm wheel connections 162 drives the sprocket wheels 67, the shaft 154 through worm and worm wheel connections also driving the shafts of the spiders 74 and 79 and drive wheels 83. As shown in Fig. 7 the shaft 154 through beveled gears 163 drives the cam shaft 102 which in turn drives the shaft 92 through the spur gears 101 and 100 and the intermittent gears 93. A further extension of the shaft 154 to the right drives the drive wheels of the conveyors 124 and 129 by the worm and worm wheel connections as shown.

Spur gears 153, 155 and 160 are, of course, accurately identical and by this drive the shafts 152 and 154 turn accurately with relation to each other with practically no relative twist and there is substantially no lost motion or twist developed between the shaft 154 and the conveying means in contact with the rods or pipes being treated.

The raw pipes received in at one end of the apparatus are thus cleaned and galvanized on the outside and enameled on the inside and delivered in perfect finished condition at the discharge end. Where the plating operation in tank 63 requires it, the pipe from the pickling or acid dipping may be subjected to the action of a neutralizing liquid before being delivered to the plating operation, this neutralizing being with or without current as desired. While the above description is directed mainly to the treatment of tubular articles such as pipes, it is obvious that the apparatus may be equally well used in connection with other elongated articles such as bars, molding strips and the like, it being only necessary to correspondingly change the enameling apparatus and for articles which will not roll to arrange the positive feeds to pass the articles from one feed to the other instead of interposing an inclined draining portion between the feeds as shown for instance at 70. It is obvious that one or more of the operations may be omitted where not desired or required and that various modifications of the apparatus may be resorted to within the scope of the invention and without departing from the novel combination set forth in the appended claims.

The methods and apparatus disclosed herein and not claimed, such for instance as the drying and the electroplating, are described and claimed in my copending applications Nos. 496,426, 496,427, and 500,902. Series of 1925.

I claim:

1. In apparatus for coating tubular articles, the combination with means for automatically plating the outside of the article, of means for automatically enameling the inside of the article without intermediate handling.

2. In apparatus for coating tubular articles, the combination with means for automatically plating the outside of the article, of means for automatically enameling the inside of the article without intermediate handling, the article being maintained in a series of substantially horizontal positions throughout said automatic operations.

3. In apparatus for coating tubular articles, the combination with means for automatically plating the outside of the article, of means for automatically cleaning the inside and the outside of the article before plating, and means for automatically enameling the inside of the article without intermediate handling between any of said operations, the article being maintained in a series of substantially horizontal positions throughout said operations.

4. The process of coating a pipe in the form of a substantially straight elongated tube having its bore small in comparison with its length comprising cleaning said pipe in a liquid having access to both the exterior and interior of the pipe and repeatedly renewing the cleaning liquid within said pipe, plating the exterior of said pipe in a liquid having access to both the exterior and interior of the pipe, passing air through the plated pipe to dry it and immediately thereafter coating the interior of said pipe with a permanent enamel and then setting said enamel within said pipe.

5. The process of coating a pipe in the form of a substantially straight elongated tube having its bore small in comparison with its length comprising cleaning said pipe in a liquid having access to both the exterior and interior of the pipe and repeatedly renewing the cleaning liquid within said pipe, pickling said pipe in an acid solution having access to both the exterior and interior of said pipe and repeatedly renewing said solution within said pipe, plating the exterior of said pipe in a liquid having access to both the exterior and interior of the pipe, applying heat and passing air through the plated pipe to dry it, and immediately thereafter coating the interior of said pipe with a permanent enamel and then setting said enamel within said pipe.

6. The process of coating a pipe in the form of a substantially straight elongated tube having its bore small in comparison with its length comprising plating the exterior of said pipe in a liquid having access to both the exterior and interior of the pipe, applying heat to dry the plated pipe and immediately thereafter coating the interior of said pipe with a permanent enamel and then setting said enamel within said pipe by the application of heat and the circulation of air through said pipe.

7. The process of coating a pipe in the form of a substantially straight elongated tube having its bore small in comparison with its length comprising plating the exterior of said pipe in a liquid having access to both the exterior and interior of the pipe, applying heat to dry the plated pipe and immediately thereafter coating the interior of said pipe with a permanent enamel and then setting said enamel within said pipe by rolling said pipe and simultaneously applying heat thereto.

8. The process of coating a pipe in the form of a substantially straight elongated tube having its bore small in comparison with its length comprising plating the exterior of said pipe in a liquid having access to both the exterior and interior of the pipe, applying heat to dry the plated pipe and immediately thereafter coating the interior of said pipe with a permanent enamel and then setting said enamel within said pipe by rolling said pipe and simultaneously applying heat thereto and circulating air therethrough.

9. Apparatus for automatically coating a pipe in the form of an elongated tube having its bore small in comparison with its length comprising plating apparatus adapted to receive a series of pipes and plate their exterior surfaces in continuous sequence in a liquid having access to the interior of said pipes, drying apparatus receiving said pipes from said plating apparatus and adapted to apply heat and continuously dry said pipes, coating means receiving said pipes immediately from said drying means and adapted to supply and distribute an enamel over the interior of the pipe, and means for immediately setting said enamel so that the pipe received by the plating apparatus is automatically plated, dried, enameled and delivered completely plated on its exterior surface and enameled on its interior surface.

10. Apparatus for automatically coating a pipe in the form of an elongated tube having its bore small in comparison with its length comprising cleaning apparatus adapted to receive a series of pipes and immerse them in a cleaning liquid and repeatedly renew said liquid within said pipes, plating apparatus adapted to receive a series of pipes and plate their exterior surfaces in continuous sequence in a liquid having access to the interior of said pipes, drying apparatus receiving said pipes from said plating apparatus and adapted to apply heat and continuously dry said pipes, coating means receiving said pipes immediately from said drying means and adapted to supply and distribute an enamel over the interior of the pipe, and means for immediately setting said enamel so that the pipe received by the plating apparatus is automatically plated, dried, enameled and delivered completely plated on its exterior surface and enameled on its interior surface.

11. Apparatus for automatically coating a pipe in the form of an elongated tube having its bore small in comparison with its length comprising cleaning apparatus adapted to receive a series of pipes and immerse them in a cleaning liquid and repeatedly renew said liquid within said pipes, pickling apparatus adapted to receive said pipes from the cleaning means and immerse said pipes in an acid solution and repeatedly renew said solution within said pipes, plating apparatus adapted to receive a series of pipes and plate their exterior surfaces in continuous sequence in a liquid having access to the interior of said pipes, drying apparatus receiving said pipes from said plating apparatus and adapted to apply heat and continuously dry said pipes, coating means receiving said pipes immediately from said drying means and adapted to supply and distribute an enamel over the interior of the pipe, and means for immediately setting said enamel so that the pipe received by the plating apparatus is automatically plated, dried, enameled and delivered completely plated on its exterior surface and enameled on its interior surface.

12. Apparatus for automatically coating a pipe in the form of an elongated tube having its bore small in comparison with its length comprising electroplating apparatus adapted to receive a series of pipes and electroplating their exterior surfaces in continuous sequence in a liquid having access to the interior of said pipes, drying apparatus receiving said pipes from said electroplating apparatus and adapted to apply heat and continuously dry said pipes, coating means receiving said pipes immediately from said drying means and adapted to supply and distribute an enamel over the interior of the pipe, and means for immediately setting said enamel so that the pipe received by the plating apparatus is automatically electroplated, dried, enameled and delivered completely plated on its exterior surface and enameled on its interior surface, said enamel setting means comprising means for applying heat and circulating air through said pipes.

13. Apparatus for automatically coating a pipe in the form of an elongated tube having its bore small in comparison with its length comprising electroplating apparatus adapted to receive a series of pipes and electroplating their exterior surfaces in continuous sequence in a liquid having access to the interior of said pipes, drying apparatus receiving said pipes from said electroplating apparatus and adapted to apply heat and continuously dry said pipes, coating means receiving said pipes immediately from said drying means and adapted to supply and distribute an enamel over the interior of the pipe, and means for immediately setting said enamel so that the pipe received by the plating apparatus is automatically electroplated, dried, enameled and delivered completely plated on its exterior surface and enameled on its interior surface, said enamel setting means comprising means for applying heat and circulating air through said pipes and simultaneously rolling said pipes to maintain an even distribution of the enamel therein.

14. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in succession and moving them adjacent said nozzle means, means for producing a relative reciprocation between said pipes and said nozzle means to cause the nozzle means to enter the pipes and supply coating material therein, and thereafter to separate said nozzle means and said pipes, said moving means then acting to carry said pipes away from said nozzle means.

15. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in succession and moving them adjacent said nozzle means, means for producing a relative reciprocation between said pipes and said nozzle means to cause the nozzle means to enter the pipes at one end thereof and supply coating material therein, and thereafter to separate said nozzle means and said pipes, said moving means then acting to carry said pipes away from said nozzle means.

16. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in succession and moving them adjacent said nozzle means, means for producing a relative reciprocation between said pipes and said nozzle means to cause the nozzle means to enter the pipes at one end thereof and supply coating material therein, and thereafter to separate said nozzle means and said pipes, said moving means then acting to carry said pipes away from said nozzle means, and means for setting said coating within said pipes comprising means for rolling said pipes during said setting.

17. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in continuous sequence and moving them adjacent said nozzle means in position to fit over said nozzle means, means providing relative movement between said nozzle means and said pipes to position said nozzle means within the pipes to supply coating to the interior thereof, and then causing a relative movement of withdrawal of said nozzle means, said moving means then resuming its movement to carry said pipes away from said nozzle means.

18. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in continuous sequence and moving them adjacent said nozzle means in position to fit over said nozzle means, means providing relative movement between said nozzle means and said pipes to position said nozzle means within the pipes to supply coating to the interior thereof, and then causing a relative movement of withdrawal of said nozzle means, said moving means then resuming its movement to carry said pipes away from said nozzle means, and means for rolling and tipping said pipes in opposite directions to distribute the coating material therein.

19. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in continuous sequence and moving them adjacent said nozzle means in position to fit over said nozzle means, means providing relative movement between said nozzle means and said pipes to position said nozzle means within the pipes to supply coating to the interior thereof, and then causing a relative movement of withdrawal of said nozzle means, said moving means then resuming its movement to carry said pipes away from said nozzle means, means for rolling and tipping said pipes in opposite directions to distribute the coating material therein and means for setting said coating in said pipes comprising means for heating said pipes and simultaneously rolling them.

20. In apparatus for coating the interior of pipes in the form of elongated tubes having a bore small in comparison with their length comprising a nozzle means adapted to enter said pipes in succession in generally horizontal position and supply coating material to the interior thereof, means for automatically receiving said pipes in succession and moving them adjacent said nozzle means, means for producing a relative reciprocation between said pipes and said nozzle means to cause the nozzle means to enter the pipes at one end thereof and supply coating material therein, and thereafter to separate said nozzle means and said pipes, said moving means then acting to carry said pipes away from said nozzle means, and means for setting said coating within said pipes comprising means for rolling said pipes during said setting and supply a current of air to one end of said pipes.

21. The process of coating pipes in the form of substantially straight elongated tubes having their bores small in comparison with their length comprising plating the exteriors of a series of pipes in sequence, accumulating a plurality of said exteriorly plated pipes in substantially horizontal position, simultaneously coating the interior of said plurality of pipes with a permanent enamel then rolling said plurality of pipes still in substantially horizontal position to distribute the enamel evenly therein while initially setting, and then further setting said enamel.

22. In apparatus for coating the interior of a pipe in the form of an elongated open-ended tube having a bore small in comparison with its length, the combination with means for automatically receiving and conveying said pipes in sequence and pausing to hold said pipes stationary, of means movable longitudinally of said pipes and comprising a nozzle adapted to enter within one end of a pipe to supply enamel to the interior of said pipe progressively along the length of the pipe, and means for automatically controlling the flow of enamel from said nozzle to supply the enamel while the nozzle is within the pipe and shut off the supply when the nozzle leaves the pipe.

23. In apparatus for coating the interior of a pipe in the form of an elongated open-ended tube having a bore small in comparison with its length, the combination with means for automatically receiving and conveying said pipes in sequence and pausing to hold said pipes stationary in substantially horizontal position, of means movable horizontally and longitudially of said pipes and comprising a nozzle adapted to enter within one end of a pipe to supply enamel to the interior of said pipe progressively from one end of the pipe to the other, and means for automatically controlling the flow of enamel from said nozzle to supply the enamel while the nozzle is within the pipe and shut off the supply when the nozzle leaves the pipe.

24. In apparatus for coating the interior of a pipe in the form of an elongated open-ended tube having a bore small in comparison with its length, the combination with means for automatically receiving and conveying said pipes in sequence and pausing to hold said pipes stationary, of means movable longitudinally of said pipes and comprising a nozzle adapted to enter within one end of a pipe to supply enamel to the interior of said pipe progressively along the length of the pipe, and means for automatically controlling the flow of enamel from said nozzle to supply the enamel while the nozzle is within the pipe and shut off the supply when the nozzle leaves the pipe, and means for subsequently rolling said pipe to distribute the enamel therein during its initial setting and subsequently completing the setting of said enamel comprising heating means and air circulating means passing air through said pipes.

25. In apparatus for coating the interior of pipes in the form of elongated open-ended tubes having bores small in comparison with their length, the combination with means for automatically receiving and conveying said pipes in sequence and pausing to hold a plurality of said pipes stationary, of means movable longitudinally of said stationary pipes and comprising a plurality of nozzles adapted to enter within the ends of the pipes to supply enamel to the interiors thereof progressively from one end of the pipes to the other, and means for automatically controlling the flow of enamel from said nozzles to supply the enamel while the nozzles are within the pipes and shut off the supply when the nozzles leave the pipes, and means for subsequently rolling said pipes during initial setting and completing the setting of the enamel comprising heating means and means for passing air through said pipes.

26. The process of coating pipes in the form of substantially straight elongated tubes having their bores small in comparison with their length, comprising automatically receiving and conveying said pipes in sequence and stopping said pipes to hold them stationary, coating the interior of the pipe with a coating material in liquid form by supplying said material to the interior of said pipe progressively along the length of the pipe, automatically controlling the flow of enamel so as to shut off the supply upon completion of the interior coating, automatically rolling said pipe in substantially horizontal position to distribute the coating evenly therein, and then heating said pipe while thus rolling it in horizontal position to set said coating material within the interior of the pipe, and directing a current of air through said pipe from end to end while it is heated so as to set said coating material in place.

27. The process of coating pipes in the form of substantially straight elongated tubes having their bore small in comparison with their length comprising warming the pipe to a temperature substantially above room temperature, automatically receiving and conveying said pipes in sequence and stopping said pipes to hold them stationary, coating the interior of the pipe with a coating material in liquid form by supplying said material to the interior of said pipe progressively along the length of the pipe, automatically controlling the flow of enamel so as to shut off the supply upon completion of the interior coating, automatically rolling said pipe in substantially horizontal position to distribute the coating evenly therein, and then heating said pipe while thus rolling it in horizontal position to set said coating material within the interior of the pipe, and directing a current of air through said pipe from end to end while it is heated so as to set said coating material in place.

KURT THEODORE POTTHOFF.